US00RE48374E

(19) United States
(12) Reissued Patent
Vandenameele et al.

(10) Patent Number: US RE48,374 E
(45) Date of Reissued Patent: Dec. 29, 2020

(54) GENERATION OF DIGITAL CLOCK FOR SYSTEM HAVING RF CIRCUITRY

(71) Applicant: Huawei Technologies Co., Ltd., Shenzhen (CN)

(72) Inventors: Patrick Vandenameele, Munich (DE); Norman Beamish, Munich (DE)

(73) Assignee: HUAWEI TECHNOLOGIES CO., LTD., Shenzhen (CN)

(21) Appl. No.: 16/413,202

(22) Filed: May 15, 2019

Related U.S. Patent Documents

Reissue of:
(64) Patent No.: 9,655,130
Issued: May 16, 2017
Appl. No.: 14/194,956
Filed: Mar. 3, 2014

U.S. Applications:
(63) Continuation of application No. PCT/EP2012/066951, filed on Aug. 31, 2012.

(30) Foreign Application Priority Data

Sep. 1, 2011 (GB) ..... 1115119.8

(51) Int. Cl.
*H04L 12/28* (2006.01)
*H04W 72/08* (2009.01)
(Continued)

(52) U.S. Cl.
CPC ..... *H04B 15/06* (2013.01); *H04W 56/00* (2013.01); *H04W 72/082* (2013.01)

(58) Field of Classification Search
CPC ..... H04B 15/06; H04W 72/082; H04W 56/00
See application file for complete search history.

(56) References Cited

U.S. PATENT DOCUMENTS 5,926,514 A 7/1999 Meador et al.
6,628,968 B1 * 9/2003 Grohn ..... H04J 3/0688 455/500
(Continued)

FOREIGN PATENT DOCUMENTS

CN 1309835 A 8/2001
CN 1518804 A 8/2004
(Continued)

OTHER PUBLICATIONS

Maeda, Kenichi et al. "Portable Communication Terminal", English Language Translation of Japanese Patent Publication 2009-118149-A, May 2009. (Year: 2009).*
(Continued)

*Primary Examiner* — Luke S Wassum
(74) *Attorney, Agent, or Firm* — Conley Rose, P. C.

(57) ABSTRACT

Circuitry for any of a transceiver, a transmitter, and a receiver, has radio frequency (RF) circuitry, digital circuitry, a carrier signal generator to provide a carrier signal to the RF circuitry and a clock generator for generating a digital clock for clocking at least some of the digital circuitry. The RF circuitry is susceptible to interference from harmonics of the clocking, and the clock generator derives a frequency of the digital clock based on a frequency divided down from a frequency of the carrier signal so that the interference to the RF circuitry occurs at frequencies which are harmonics of the carrier signal.

14 Claims, 14 Drawing Sheets

(51) Int. Cl.

| | |
|---|---|
| ***H04B 15/06*** | (2006.01) |
| ***H04W 56/00*** | (2009.01) |

(56) References Cited

U.S. PATENT DOCUMENTS

| | | | | |
|---|---|---|---|---|
| 6,898,420 | B2 | 5/2005 | Black et al. | |
| 7,103,342 | B2 | 9/2006 | Kusbel et al. | |
| 7,580,691 | B1 * | 8/2009 | Reed | H04B 15/06 331/19 |
| 7,620,131 | B2 * | 11/2009 | May | H04B 15/02 327/144 |
| 7,676,192 | B1 | 3/2010 | Wilson | |
| 7,949,015 | B2 * | 5/2011 | Miljkovic | G06F 1/10 370/503 |
| 8,306,524 | B2 * | 11/2012 | Jung | G06F 1/08 375/345 |
| 8,488,568 | B2 * | 7/2013 | Duenyas | H04W 72/082 370/337 |
| 8,548,104 | B2 * | 10/2013 | Oren | H04B 15/06 375/327 |
| 8,599,825 | B2 * | 12/2013 | Kim | H04W 56/00 370/350 |
| 2001/0040932 | A1 | 11/2001 | Lindquist et al. | H04B 15/04 375/346 |
| 2001/0047325 | A1 | 11/2001 | Livingston | |
| 2001/0055354 | A1 * | 12/2001 | Fung | G06Q 40/02 375/354 |
| 2002/0142745 | A1 | 10/2002 | Kang et al. | |
| 2007/0011482 | A1 | 1/2007 | Sai et al. | |
| 2007/0116148 | A1 | 5/2007 | Lowe et al. | H04B 15/02 375/316 |
| 2007/0165747 | A1 | 7/2007 | May et al. | |
| 2008/0024339 | A1 * | 1/2008 | Hayem | H04B 15/06 341/126 |
| 2008/0025379 | A1 * | 1/2008 | Hayem | H04B 15/06 375/216 |
| 2009/0003496 | A1 | 1/2009 | Amano | |
| 2009/0080498 | A1 | 3/2009 | Deisher et al. | H04B 1/715 375/136 |
| 2009/0221235 | A1 | 9/2009 | Ciccarelli et al. | |
| 2010/0002683 | A1 * | 1/2010 | Miljkovic | G06F 1/10 370/352 |
| 2011/0075721 | A1 | 3/2011 | Minakawa et al. | H04B 15/02 375/238 |
| 2011/0136475 | A1 * | 6/2011 | Jung | G06F 1/08 455/414.1 |

FOREIGN PATENT DOCUMENTS

| | | | | |
|---|---|---|---|---|
| CN | 1897464 | A | | 1/2007 |
| CN | 101204055 | A | | 6/2008 |
| CN | 101335531 | A | | 12/2008 |
| CN | 101383613 | A | | 3/2009 |
| CN | 101506754 | A | | 8/2009 |
| CN | 101803218 | A | | 8/2010 |
| CN | 101960720 | A | | 1/2011 |
| JP | 2009118149 | A | * | 5/2009 |
| JP | 2009118149 | A | | 5/2009 |
| JP | 2010050780 | A | * | 3/2010 |
| JP | 2010050780 | A | | 3/2010 |

OTHER PUBLICATIONS

Hata, Takeshi et al. "Radio Communication Terminal and Method for Controlling Radio Communication", English Language Translation of Japanese Patent Publication 2010-050780-A, Mar. 2010. (Year: 2010).*

SIPO "First Office Action", Chinese Patent Application 2012-80042564.0, dated Mar. 7, 2017. (Year: 2017).*

SIPO "First Office Action", Chinese Patent Application 2018-11095182.X, dated Oct. 18, 2019. (Year: 2019).*

Partial English Translation and Abstract of Japanese Patent Application No. JP2009118149A, Jul. 25, 2014, 3 pages.

Partial English Translation and Abstract of Japanese Patent Application No. JP2010050780A, Jul. 25, 2014, 10 pages.

Foreign Communication From a Counterpart Application, Application No. GB1115119.8, Search Report dated Sep. 16, 2011, 4 pages.

Foreign Communication From a Counterpart Application, PCT Application No. PCT/EP2012/066951, International Search Report dated Mar. 11, 2013, 4 pages.

Foreign Communication From a Counterpart Application, PCT Application No. PCT/EP2012/066951, Written Opinion dated Mar. 11, 2013, 5 pages.

* cited by examiner

700

GENERATION OF DIGITAL CLOCK FOR SYSTEM HAVING RF CIRCUITRY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is *a Reissue Application of patent application Ser. No. 14/194,956 filed on Mar. 3, 2014, now U.S. Pat. No. 9,655,130, which is* a continuation of International Application No. PCT/EP2012/066951[,] filed on Aug. 31, 2012, which claims priority to British Patent Application No. GB1115119.8[,] filed on Sep. 1, 2011, all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to circuitry for any of a transceiver, receiver and transmitter, and having digital circuitry and having radio frequency (RF) circuitry susceptible to interference from the harmonics of the clocking of the digital circuitry. It can be applied generally to digital communication techniques and radio transceivers. More specifically, some embodiments involve dynamically selecting the frequencies of clock signals used in a radio system.

BACKGROUND

The rapid global spread of modern cellular communication systems has been primarily driven by three factors: standardisation, cost and performance. The availability of universal communication standards promulgated by organisations such as 3rd Generation Partnership Project (3GPP) allows manufacturers to produce a single product for a global market. The low cost of cellular communications is primarily due to the high levels of functional integration achievable in modern microchip technology and the size of the global market which offers significant economy of scale benefits to manufacturers. The high performance of cellular communications is achieved through exploitation of the functional capabilities of modern semiconductor technology.

Increased functional integration in a radio transceiver leads to the analog and digital functions of the radio transceiver being closely located to each other. It is well known in the prior art that reduced physical separation between radio circuit components leads to an increase in mutual self-interference. Typically, a digital clock will consist of a train of rectangular pulses and will be rich in harmonic content. The integration of digital circuit elements which utilise a digital clock can therefore lead to radio frequency (RF) interference at harmonic frequencies of the digital clock. Typically, the transceiver will be most vulnerable to this type of interference when it tries to receive low power signals at RF frequencies at or close to harmonics of any digital clock used in the transceiver.

Modern cellular radio transceivers are required to operate in a plurality of frequency bands. It is also necessary for a modern transceiver to achieve the desired performance levels required by standards such as 3GPP, and it is therefore necessary for the modern transceiver to contain a significant digital signal processing capability. Furthermore, as it is expensive and time consuming to develop a radio transceiver in an advanced semiconductor manufacturing process, it is a desirable requirement that a radio transceiver be sufficiently flexible to operate in frequency bands that might in the future be designated as cellular bands by the standardisation authorities.

U.S. Pat. No. 5,926,514 discloses changing a clock signal used by a microcontroller unit in a radio transceiver in response to changes in the operating frequency of the radio transceiver.

U.S. Pat. No. 7,103,342 discloses changing a clock signal used by a microcontroller unit in a radio transceiver in order to minimise interference at the selected operating frequency of the radio transceiver.

U.S. Pat. No. 6,898,420 discloses toggling a clock signal used by a microcontroller between two possible frequencies.

U.S. Pat. No. 7,676,192 discloses a technique to change the operating frequency of a device and the signal frequency of a co-located signal source in order to minimise interference that is introduced on the wireless interface of that device.

There remains a need for techniques which can be employed to address the impact of clock harmonic interference in a radio transceiver.

SUMMARY

An object of the present invention is to provide alternative circuitry for radio wireless systems, especially transceivers for radio wireless systems with an enhanced immunity to clock harmonic interference.

According to a first aspect of the invention, there is provided circuitry for any of a transceiver, a transmitter, and a receiver, and having RF circuitry, digital circuitry, a carrier signal generator and a clock generator for generating a digital clock for clocking at least some of the digital circuitry, the RF circuitry being susceptible to interference from harmonics of the clocking of the digital circuitry, the carrier signal generator being coupled to provide a carrier signal to the RF circuitry, and the clock generator being arranged to derive a frequency of the digital clock based on a frequency divided down from a frequency of the carrier signal so that the interference to the RF circuitry occurs at frequencies which are harmonics of the carrier signal.

Since any interference from harmonics of the digital clock are at frequencies which are harmonics of the carrier, they can be compensated more easily, or can be arranged to have frequencies far enough away from useful parts of the RF signals to be filtered out more easily. The digital circuitry can encompass analog-to-digital converter (ADC), digital-to-analog converter (DAC), or digital processing circuitry in a receiver or transmitter chain for example. References to digital can encompass discrete time clocked analog for example. The transceiver example is for use in communications applications for example, though one way radio applications include global positioning system (GPS) receivers for example.

Embodiments of the invention can have any other features added, or any other features disclaimed. Some such additional features are set out in dependent claims and described in more detail below.

Another aspect provides a corresponding method of generating a digital clock for clocking digital circuitry associated with any of a transceiver, a transmitter, and a receiver, and the method having the steps of generating a carrier signal for RF circuitry, the RF circuitry being susceptible to interference from harmonics of the clocking of the digital circuitry, and deriving a frequency of the digital clock based on a frequency divided down from a frequency of the carrier signal so that the interference to the RF circuitry occurs at frequencies which are harmonics of the carrier signal.

Embodiments of the present invention can provide novel implementations of radio wireless communication systems. Its advantages are particularly useful for communication systems involved in simultaneously transmitting and receiving RF signals.

Some additional features are as follows.

The clock generator can have one or more programmable frequency dividers to generate the digital clock. With reference to FIG. 3, 4, or 5 for example, this can enable more flexibility in the design and operation of the digital circuitry and can enable tuning to reduce the interference in practice.

The clock generator can have two or more oscillators for generating the carrier signal at different carrier frequencies, and have a selector for selecting which of the carrier frequencies is used as a source to generate the digital clock. With reference to FIG. 5 for example, this can provide more flexibility in choosing the digital clock frequency and thus can improve a trade-off between for example maximum output power and receiver noise. In some cases, the oscillators can be for receive and transmit respectively, or can be for multiple protocols or standards for either one of receiving or transmitting. The digital circuitry clocked by the digital clock can comprise any one or more of: analog to digital conversion circuitry for received signals, digital to analog conversion circuitry for transmitted signals, digital processing circuitry for processing the received or transmitted signals, and a digital part of the clock generator.

The circuitry can have a fallback oscillator for generating a fallback reference frequency, and the clock generator can have a fallback selector to select the fallback reference frequency as a source from which to generate the digital clock if the carrier frequency is not suitable. With reference to FIGS. 3 to 6 for example, this can help improve reliability which is particularly useful for higher frequencies such as 11 Gigahertz (GHz) where it is hard to get a reliable carrier signal. This also enables the digital circuitry to be more independent, which is useful for example if running layers of software which should be able to ran without concern for clock rate.

The fallback selector can have a monitor for monitoring a stability of the carrier signal, and can be operable to select the fallback reference frequency depending on the monitor output. With reference to FIGS. 6, 7 and 8 for example, this can further improve the reliability of the clock generator.

The clock generator can have a controller for selecting a change in frequency of the digital clock, based on a quality of an output of digital processing of received or transmitted signals clocked by the digital clock and based on the interference caused by the clocking. With reference to FIGS. 2, 12 and 13 for example, this can help enable a better trade off between better performance from faster digital processing, and increased interference from the faster digital clock.

The controller can be arranged to estimate a digital clock rate needed by a respective type of digital receiver processing to achieve a predetermined minimum signal to noise ratio for a signal being received, and to determine whether the interference caused by that estimated digital clock rate is within an acceptable threshold, as a basis for selecting a change in frequency for the digital clock. This can be useful for example where downstream processing relies on a given minimum noise. It can take into account that the error-free decoding of higher order modulations requires a certain signal-to-noise and distortion ratio (SINAD) out of the transceiver and reassigns the SINAD contribution of clock-related interference to be relatively higher in favor of enhanced processing speed.

The circuitry can have a digital compensation circuit for digitally compensating at least some of the digital processing circuitry clocked by the digital clock, based on a change in the frequency of the digital clock. With reference to FIGS. 15 and 16, this can help enable digital processing to be designed to be more independent of changes in clock rate. In some cases, the digital compensation circuit can comprise a digital resampling circuit to carry out resampling by a ratio inversely proportional to the change in frequency of the digital clock. This allows decoupling of clock rate from sample rate to enable each to be optimized separately, which can for example mean reduced processing needs by returning to an optimal sample rate.

The circuitry can be part of an integrated circuit. This can enable a cost reduction from more integration, but the interference can be more critical. The circuitry or the integrated circuit can be part of a mobile device such as a mobile phone or hand held computing device.

The method can have additional steps corresponding to the additional features set out above. There can be a step of programming one or more programmable frequency dividers to alter the frequency of the digital clock. The method can have the step of generating two or more carrier signals at different carrier frequencies, and selecting which of the carrier frequencies is used as a source to generate the digital clock. There can be steps of estimating a digital clock frequency needed by a respective type of digital receiver processing to achieve a predetermined minimum signal to noise ratio for a signal being received, determining whether the interference caused by that estimated digital clock frequency is within an acceptable threshold, and based on this determination, selecting a change in frequency for the digital clock. There can be a step of resampling a digital signal used by the digital circuitry by a ratio inversely proportional to the change in frequency of the digital clock. Another step can be compensating for the interference in the RF circuitry from the harmonics of the clocking of the digital circuitry.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
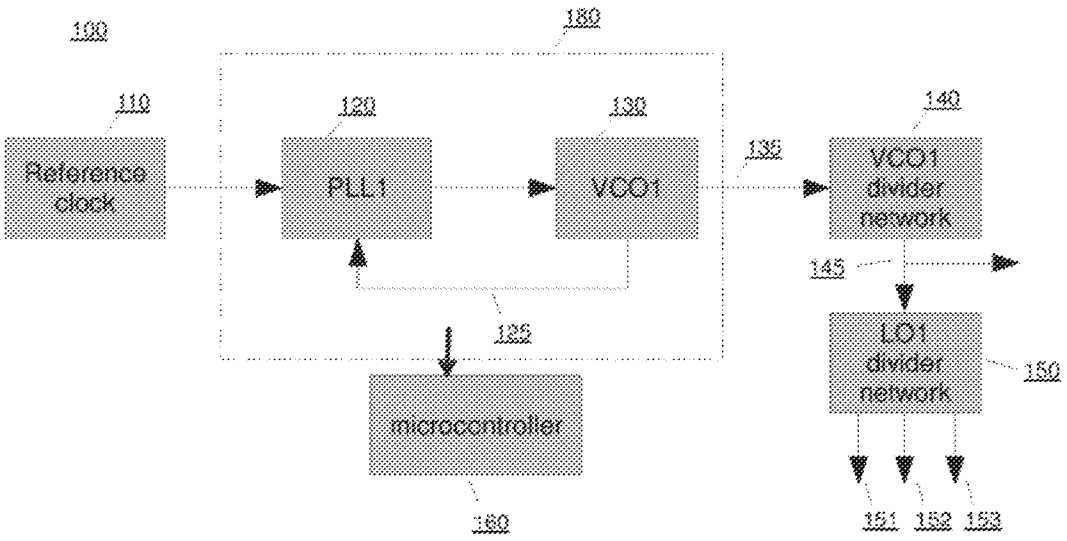
Fig. 1 PRIOR ART
FIG. 1 shows a schematic view corresponding to a known arrangement.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and. B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction, FIG. 1, known arrangement:

By way of introduction to the embodiments, an arrangement corresponding to known systems will be described with reference to FIG. 1. In the prior art, a typical transceiver comprises means to generate the required RF signals by utilising one or more voltage controlled oscillators (VCOs) and one or more phase locked loops (PLLs) to generate carrier signals at the selected radio frequencies. The generated carrier signals are used in the process of converting a baseband signal into an RF signal to be transmitted and converting a received RF signal into a corresponding baseband signal. FIG. 1 illustrates a frequency generation subsystem 100 of a typical modern wireless communication transceiver. Reference clock generator 110 delivers a reference clock signal to VCO frequency control part 180 which comprises miscellaneous PLL circuitry 120 and VCO 130. Connection 125 provides the necessary feedback signal to lock the loop. Signal 135 is the output signal from VCO 130 which oscillates at the selected VCO frequency. Divider network 140 generates an output signal 145 which is oscillating at a frequency which is a divisor of the frequency of signal 135. Signal 145 is typically known as a carrier or a local oscillator (LO) signal and is typically used by a radio transceiver in the frequency up-conversion and down-conversion processes. Divider network 150 is used to generate a number of output signals 151, 152 and 153. Signals 151, 152 and 153 oscillate at frequencies which are a divisor or divisors of the frequency of input signal 145. Microcontroller 160 typically controls and programs each of PLL 120, VCO 130, and divider networks 140 and 150.

Figure 2:
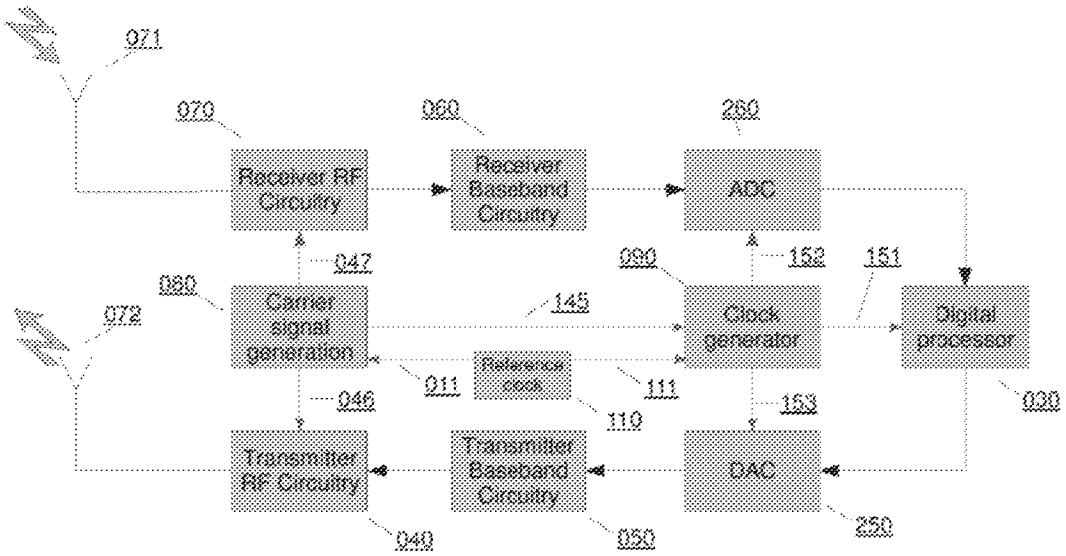
FIG. 2 shows a schematic view of a transceiver having circuitry according to a first embodiment.

FIG. 2, transceiver having circuitry according to a first embodiment:

Some embodiments of the invention help enable a radio transceiver to operate in the possible presence of a harmonic interference from one or more clock signals without degrading performance when the clock harmonic interference is not present. The radio transceiver can be made sufficiently robust in the presence of this interference to maintain the required level of performance. FIG. 2 shows a schematic view of a transceiver having circuitry according to a first embodiment. A receive antenna 71 is coupled to receiver RF circuitry 70, which feeds receiver baseband circuitry 60. This outputs an analog signal which is converted to digital form by ADC 260. The digital signals are processed by digital processor 30 which can be implemented in various ways to do various conventional signal processing tasks on the received signals.

A carrier signal generation part 80 feeds a local carrier signal 47 to the receiver RF circuitry 70. The carrier signal generation part 80 also generates a local carrier signal 46 for the transmitter side of the transceiver. A selected one of the carrier signals is also sent to a clock generator part 90, for generating one or more digital clocks derived by dividing down the selected carrier frequency. In the example shown, the digital clocks derived in this way are used for the ADC, DAC as well as the digital processor. In some cases other digital circuitry within the radio transceiver can be clocked in this way from one or other of the transmitter or receiver carrier signals. Generating the digital clocks (152, 153 and 151 respectively) in this fashion guarantees that any clock harmonic interference that occurs will be located at the same frequency as the selected carrier signal. Interference occurring at this location is similar to direct current (DC) offset in the baseband signal for which many compensating techniques are known in the prior art. By extension, the method may also target the clock harmonic interference at frequencies that are benign from a radio point of view, for instance due to filter attenuation in other places in the system and/or due to more relaxed spectrum restrictions, without loss of generality.

There is also a reference clock part 110, for generating a reference clock to provide as a stable frequency reference source 011 for the carrier generation, and a backup signal 111 for the clock generator 90. The transmitter side includes a DAC 250, transmitter baseband circuitry 50, and transmitter RF circuitry 40, which uses the transmitter local carrier 46, and feeds transmit antenna 72. Examples of how to implement the carrier signal generation part 80 and clock generator part 90 will be described with reference to FIGS. 3 to 5.

Figure 3:
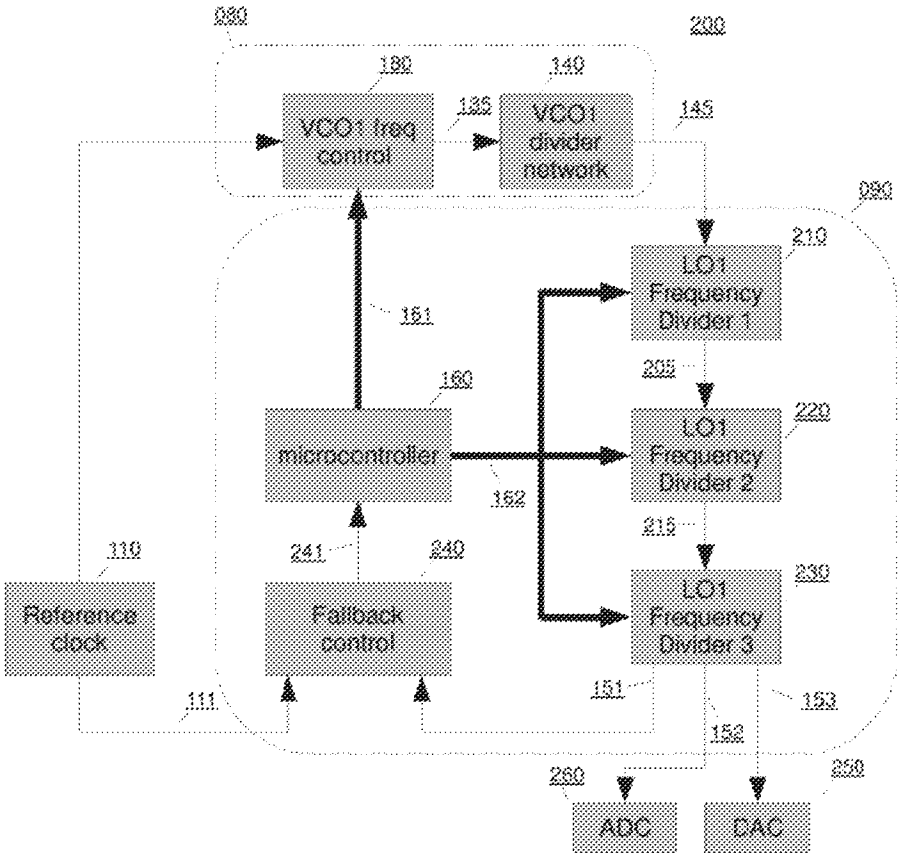
FIGS. 3, 4 and 5 show schematic views of clock generators and other parts of further embodiments.

FIG. 3, clock generator and other parts according to an embodiment:

FIG. 3 illustrates in more detail an example o some of the circuitry for use in the embodiment of FIG. 2 (or other embodiments). This part 200 of the circuitry, has a reference clock 110, a carrier generator 80, and a clock generator 90 and some digital parts such as the ADC and DAC.

Reference clock generator 110 delivers a reference clock signal to the input of VCO1 frequency control 180 which can be implemented as shown in FIG. 1, by PLL circuitry 120 and VCO 130 each of which can be implemented by circuits known in the prior art. VCO1 divider network 140 performs a frequency division on the output signal from VCO frequency control 180 to generate a local carrier signal 145 which is oscillating at a frequency which is a divisor of the frequency of signal 135. Carrier signal 145 can be generated in the same manner as in FIG. 1, and is the signal used for generating a receiver or transmitter carrier signal.

LO frequency divider units 210, 220 and 230 are subsidiary components of LO divider network 150 with intermediate signals 205 and 215 being available as shown here. Carrier signal 145 is frequency divided using LO1 frequency divider 210 producing intermediate signal 205. Signal 205 is further frequency divided using LO2 frequency divider 220 producing intermediate signal 215. Finally, signal 215 is frequency divided using LO3 frequency divider 230 producing final digital clock signals 151, 152 and 153, which need not be the same frequency but are all derived from the carrier. In this figure, 153 is an example of the digital clock signal sent to digital circuitry associated with the receiver, transmitter or transceiver. Examples of such digital circuitry are DAC 250 and ADC 260. Another example of the digital clock is signal 152, which is the digital clock signal for ADC 260. Digital clock signal 151 is sent to fallback control unit 240. Fallback control unit 240 also receives signal 111 from the reference clock generator. Signal 241, which is the output of fallback control unit 240, is used as the clock signal for microcontroller 160. More details of how to implement the fallback control part will be described below with reference to FIGS. 6 to 10. Microcontroller 160 is provided for controlling and programming other parts such as VCO1 frequency control 180, VCO1 divider network 140 and frequency divider networks 210, 220 and 230. Microcontroller 160 uses control bus 161 to control VCO frequency control unit 180 and uses control bus 162 to control LO frequency divider units 210, 220 and 230.

Signal 151 is used as a clock for microcontroller 160 and other digital logic within the transceiver, signal 152 is used as a sampling clock for ADC 260 and signal 153 is used as a sampling clock for DAC 250. Signals 151, 152 and 153 are all derived from signal 145, which is also used as an RF carrier signal by the transceiver, therefore provided all the divisors implemented within blocks 140, 210, 220 and 230 are individually integers not fractions, then any clock harmonic interference caused by signals 151, 152 or 153 will be seen at the RF carrier frequency. This relationship between the frequency of clock harmonic interference and the carrier signal frequency will remain even if the frequency of the carrier signal changes. Therefore, it becomes possible to change the carrier signal frequency and still compensate the clock harmonic interference in the same way.

Figure 4:
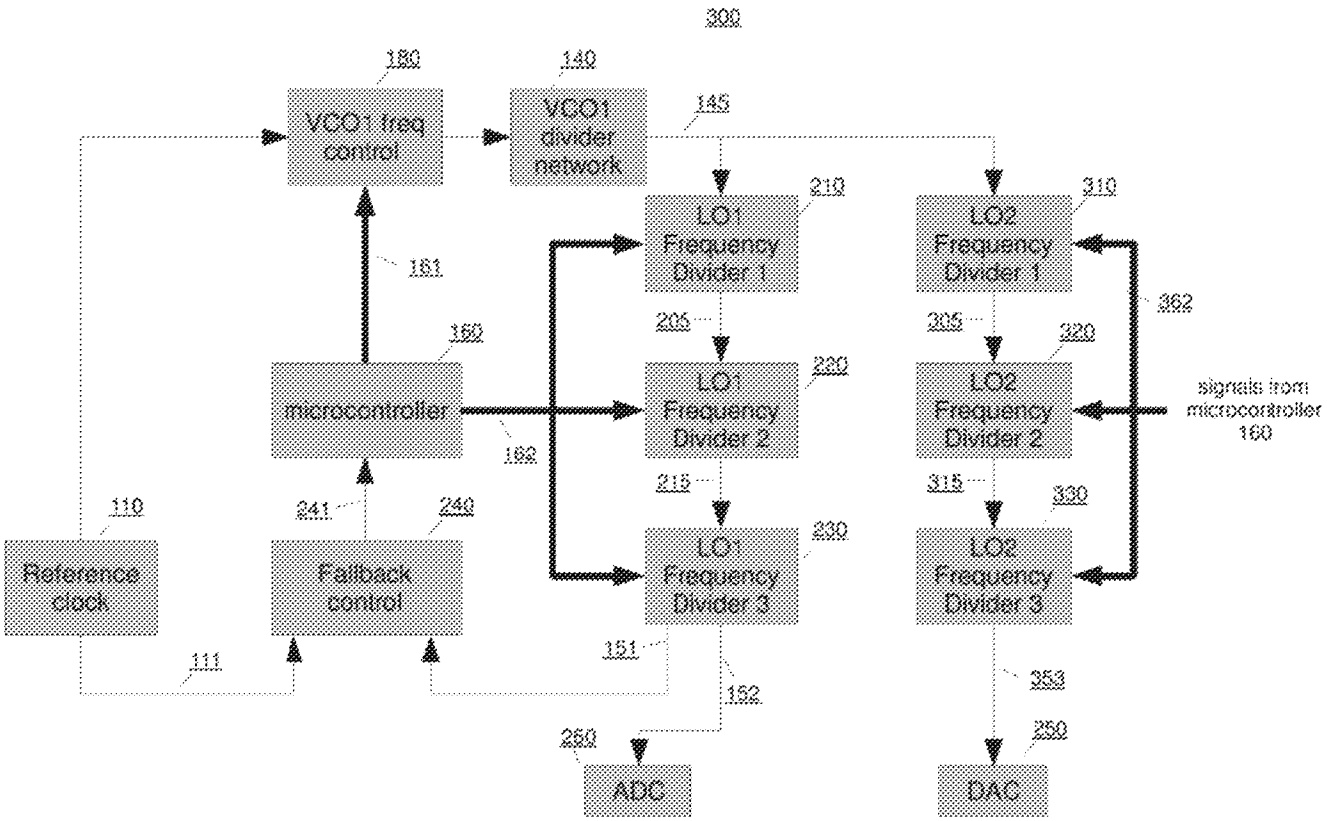

FIG. 4, another embodiment:

FIG. 4 shows parts 300 of circuitry similar to that of FIG. 3 and illustrating an extension of the clock generation system shown in FIG. 3. DAC 250 now uses signal 353 as its clocking signal. Signal 353 is generated by applying signal 145 to the set of LO frequency dividers 310, 320 and 330. Intermediate signals 305 and 315 are also shown. LO frequency dividers 310, 320 and 330 are controlled by microcontroller 160 using control bus 362. Signal 353 is generated using a set of LO3 frequency dividers (310, 320 and 330) that is functionally identical to the set of LO2 frequency dividers (210, 220 and 230) but can be programmed independently by microcontroller 160. This permits signals 152 and 353 to be programmed to have different frequencies and to be changed independently, while still both are derived from signal 145.

Figure 5:
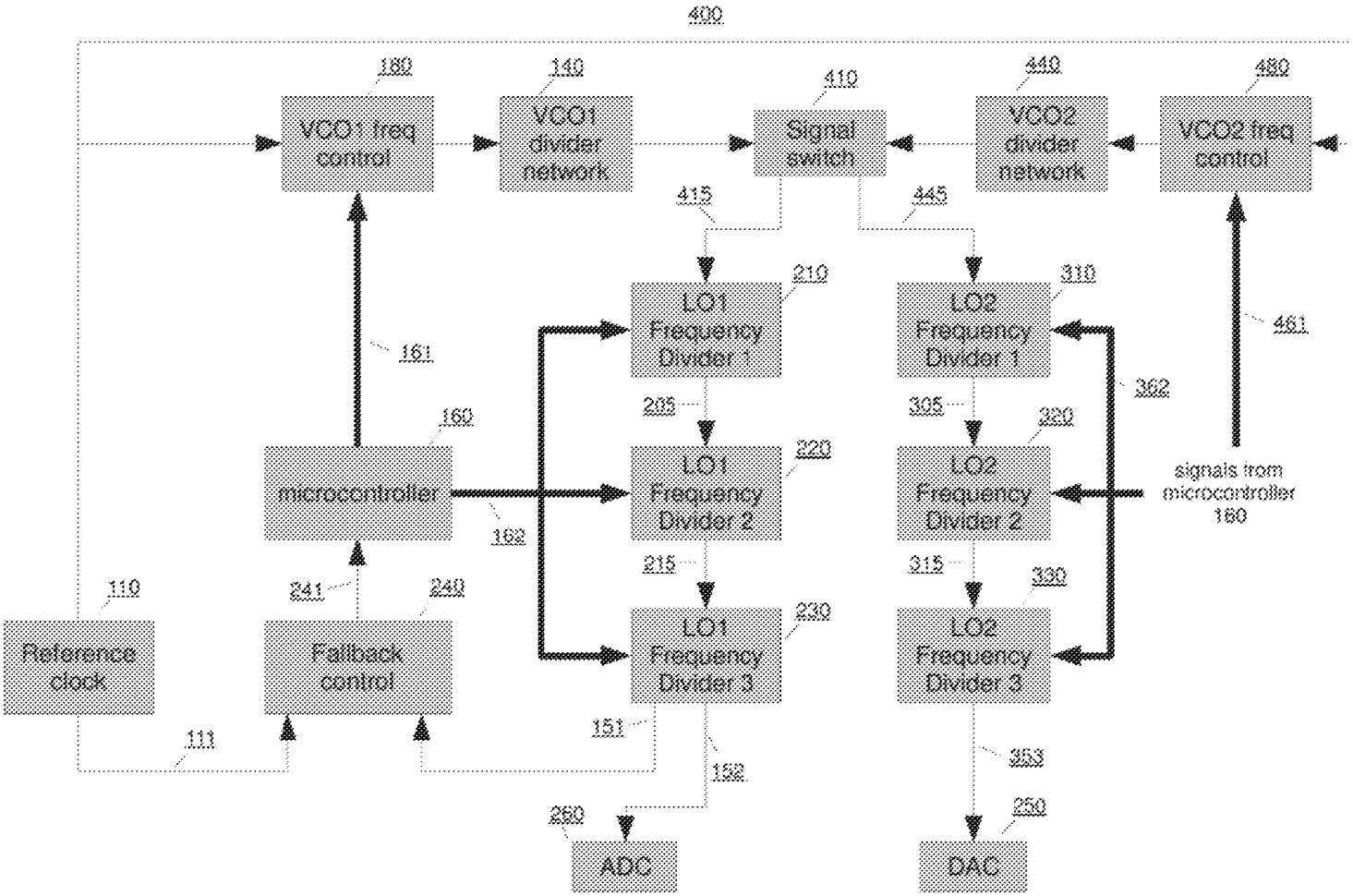

FIG. 5, another embodiment with selectable carrier:

FIG. 5 shows parts 400 of circuitry similar to that of FIG. 4 and illustrating an extension of the clock generation system shown in FIG. 4. A switch 410 is provided to connect either VCO1 divider network 140 or VCO2 divider network 440 to LO1 frequency divider 210. Switch 410 is also used to connect either VCO1 divider network 140 or VCO2 divider network 440 to LO2 frequency divider 310. LO frequency dividers 210 and 310 are driven by signals 415 and 445 respectively from switch 410. VCO 2 divider network 440 is fed by VCO2 frequency control unit 480 which is controlled by microcontroller 160 using control bus 461. In another variation (not illustrated), the digital clock signal 151 can also be taken from either of the intermediate signals 205 and 215.

Figure 6:
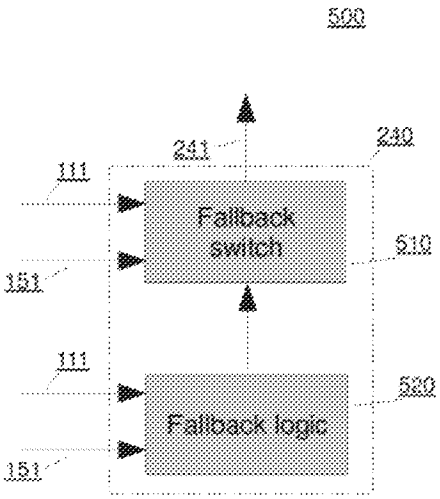
FIG. 6 shows a schematic view of a fallback control part for use in some embodiments.

FIGS. 6 to 10, implementation of fallback control:

FIG. 6 shows part 500 of circuitry used to implement fallback control unit 240. Fallback logic subunit 520 uses the states of input signals 111 and 151 to determine how to control switch subunit 510. Fallback switch subunit 510 can be configured to connect output signal 241 to either input signal 111 or to input signal 151.

Figure 7:
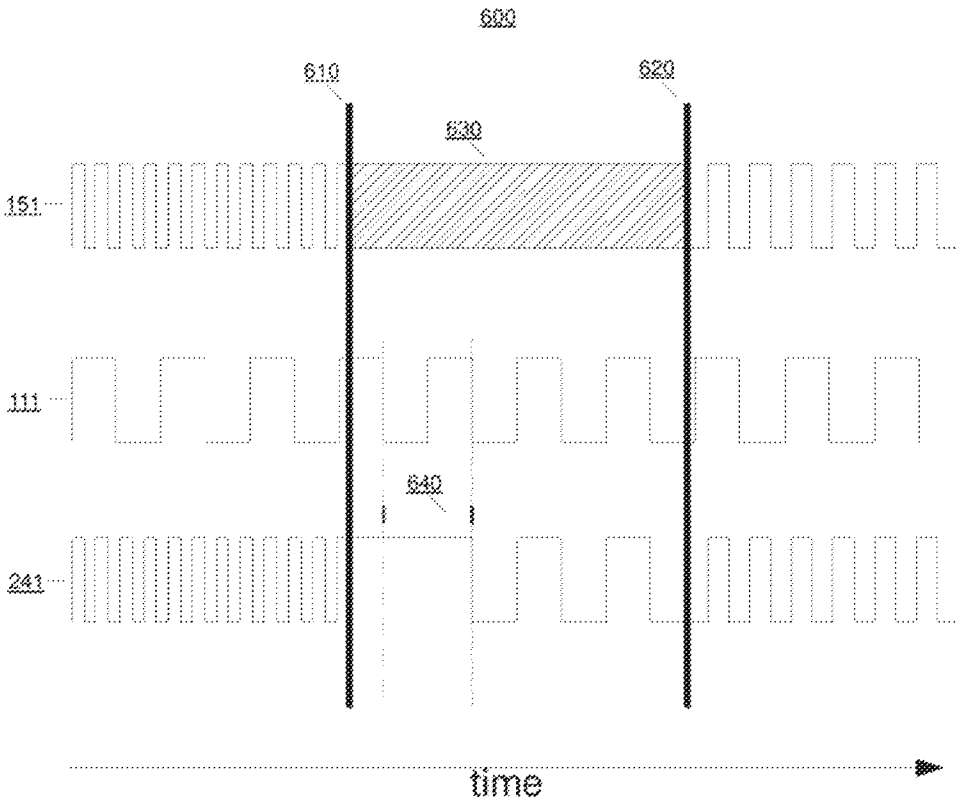
FIG. 7 shows a graph of timings of clock signals.

FIG. 7 shows a graph 600 which illustrates waveforms over time for signals 151, 111 and 241 during a typical period of operation of the fallback control unit 240. The clock signal 151 can enter an unknown state 630 due to the reprogramming of VCO frequency control 170. In this case, a fallback control unit 240 is used to ensure that the digital clock signal 241 is maintained in a known state so that microcontroller 160 can continue to function correctly. Signal 151 and fallback output signal 241 are identical until time 610. At time 610, the signal 151 enters an undefined state 630 which lasts until time 620. After time 610, fallback control subunit 520 can no longer detect or count clock cycles of signal 151. If this condition persists for longer than a preset number of periods (time interval 640) of reference clock 111, then fallback control subunit 510 connects fallback output signal 241 to signal 111.

Figure 8:
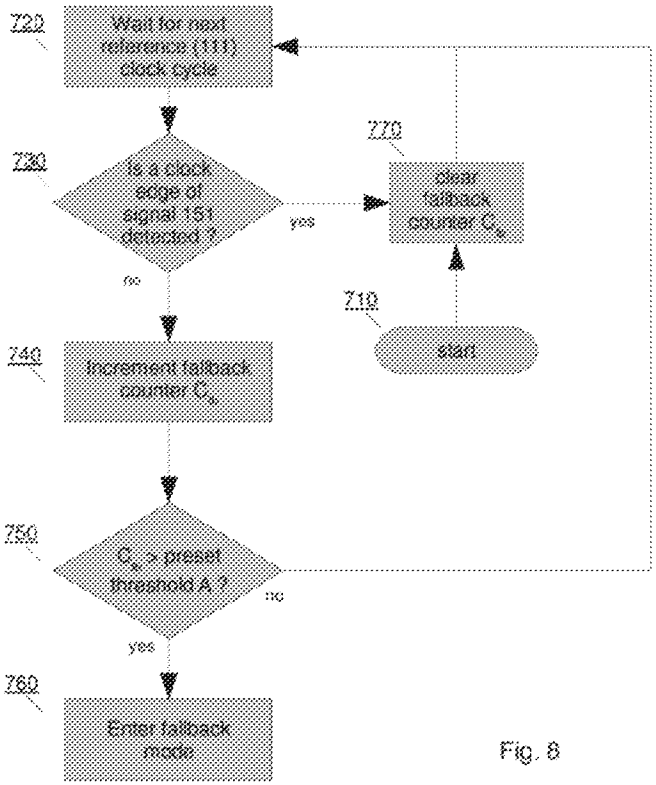
FIG. 8 shows steps in entering a fallback mode for use in some embodiments.

FIG. 8 shows a sequence 700 of steps to illustrate a typical decision process carried out in fallback control subunit 520 in determining whether to enter fallback mode. In the event that VCO 130 is retuned, then signal 135 and all derivative signals will become unstable until signal 135 at the output of VCO 130 returns to a stable steady state. Fallback logic subunit 520 monitors the stability and presence of input clock 151 by detecting at least one edge of clock 151 during every cycle of reference clock 111 as shown in steps 720, 730 and 770. After starting at terminal 710, the fallback counter is cleared in step 770. The process pauses at step 720 where subunit 520 waits until it detects a clock edge of the reference clock signal 111. In the step 730, subunit 520 determines whether it has detected a clock edge of signal 151. If it has, then the fallback counter is cleared in step 770 and subunit 520 returns to step 720. During time period 630 when signal 151 enters an unknown state fallback logic subunit 520 will execute steps 740 and 750. If no clock edge of signal 151 has been detected then the fallback counter is incremented in step 740. In step 750, the value of the fallback counter is compared against a preset threshold. If the value of the fallback counter is below the preset threshold, then subunit 520 returns to step 720 otherwise it enters fallback mode in step 760. When a clock signal 151 has not been detected for a preset number 640 of reference clock 111 periods, then fallback logic subunit 520 configures fallback switch subunit 510 to connect input signal 111 to output signal 241.

Figures 9, 10:
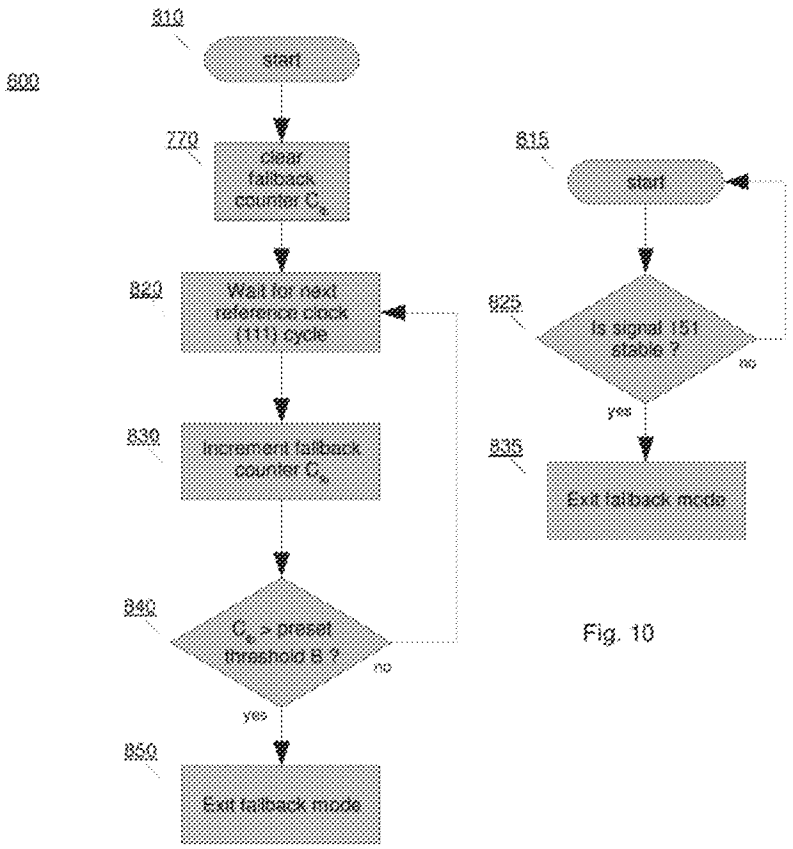
FIGS. 9 and 10 show steps in exiting a fallback mode for use in some embodiments.

FIG. 9 shows a sequence 800 of steps to illustrate a typical decision process carried out in fallback control subunit 520 in determining whether to exit fallback mode. In the first embodiment, after starting at terminal step 810 the fallback counter is cleared in step 770. At time 620, which occurs at the end of time period 630, signal 151 returns to a stable steady state and it is possible for fallback control subunit 520 to reconfigure fallback switch subunit 510 to connect input signal 151 to output signal 241. Steps 820, 830 and 840 combine to count reference clock signals and compare the count against a preset threshold. When the preset threshold is exceeded, subunit 520 in step 850 instructs subunit 510 to reconnect signal 241 to signal 151. Thus, the fallback control subunit 510 makes this reconfiguration after a preset number of reference clock 111 periods have elapsed since entering fallback mode in step 760.

FIG. 10 shows an alternative sequence of steps. After starting at terminal step 815 subunit 520 in step 825 makes a determination as to whether signal 151 is stable and if the determination is affirmative, the fallback control unit exits fallback mode in step 835. In an alternative variation, the fallback logic subunit 520 monitors the stability and presence of input clock 151 by detecting at least one edge of clock 151 during a predefined time interval.

Figure 11:
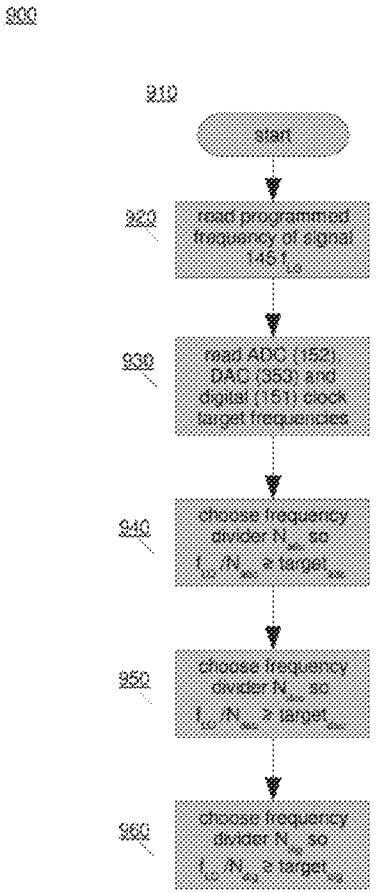
FIG. 11 shows steps in controlling programmable frequency dividers according to an embodiment.

FIG. 11, selecting clock frequencies:

FIG. 11 shows a sequence of steps 900 illustrating an example of part of a procedure carried out in microcontroller 160 to select the clock frequencies of ADC 260, DAC 250 and digital clock 151. Microcontroller 160 determines how to program frequency dividers 210, 220 and 230 and frequency dividers 310, 320 and 330 in order to obtain clock frequencies for ADC sampling clock 152, DAC sampling clock 353 and digital clock 151 that are at or above the respective target frequencies. The target frequencies can be set using criteria including, but not limited to, satisfying Nyquist's 1st sampling theorem, power minimisation and maximisation of oversampling noise reduction gain.

After starting at terminal step 910, step 920 determines the current frequency of LO signal 145. In step 930, the target clock frequencies for ADC 152, DAC 353 and digital clock 151 are read. In step 940, the frequency divider setting Nadc is chosen to meet the constraint in step 940 subject to Nadc being implementable as a divisor from the combination of frequency dividers 210, 220 and 230. In step 950, the frequency divider setting Ndac is chosen to meet the constraint in step 950 subject to Ndac being implementable as a divisor from the combination of frequency dividers 310, 320 and 330. In step 960, the frequency divider setting Ndig is chosen to meet the constraint in step 960 subject to Ndig being implementable as a divisor from the combination of frequency dividers 210, 220 and 230.

In some cases, the microcontroller 160 will take into account link layer parameters such as data rate, modulation order, channel code strength and so on in order to optimize the clock frequencies for ADC sampling clock 152, DAC sampling clock 353 and digital clock 151. The generation of the clocks can take into account the required input signal-to-noise ratio (SNR) as a function of the link layer control parameters. For example, it can take into account that the error-free decoding of higher order modulations requires a certain SINAD out of the transceiver and reassigns the SINAD contribution of clock-related interference to be relatively higher in favor of enhanced processing speed.

Figure 12:
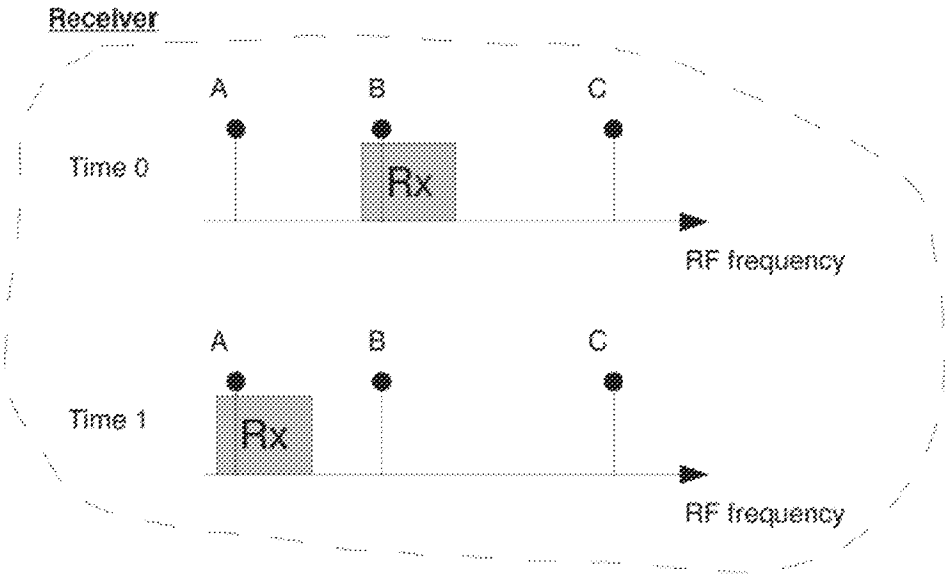
FIG. 12 shows graphs of received signal spectrum at different times.

FIG. 12, selecting clock frequency to reduce interference:

FIG. 12 shows a spectrum of a received signal at two different times and shows three possible clock harmonic interference signals. In a receiver at time 0, there are three options available for selecting a digital clock frequency {clock1 , clock2, clock3}. Each of the clock frequency options generates one of a set of corresponding interfering signals A, B and C respectively. At time 0, only one of these possible interfering signals, interferer B, lies within the desired signal band. Therefore at time 0, one of the digital clock frequencies clock1 or clock3 can be selected without generating an interfering signal in the desired signal band. At time 1, the frequency location of the desired signal is changed so that now it overlaps with interferer signal A. Therefore at time 1, one of the clock frequencies clock2 or clock3 is selected.

Figure 13:
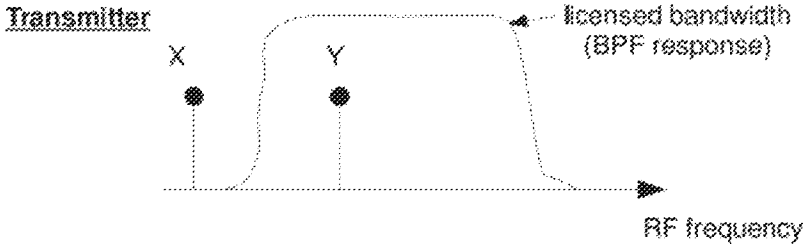
FIG. 13 shows a graph of transmitted signal spectrum.

FIG. 13, spectrum of a transmitted signal:

FIG. 13 shows a spectrum of a transmitted signal at two different times and shows two possible clock harmonic interference signals. In a transmitter, there are two options available for selecting a digital clock frequency {clock1, clock2}. Each of these two clocks has a respective corresponding interfering signal {X, Y} that is produced as a byproduct of the clock generation process. In the figure, only the interferer Y lies within the licensed bandwidth. A typical cellular transmitter will have a surface acoustic wave (SAW) bandpass filter (BPF) centred on the licensed bandwidth. Therefore a self-generated interfering signal that lies outside the licensed bandwidth will be attenuated by bandpass filtering. Therefore in this scenario, it is advantageous to select clock frequency clock1 so that the corresponding interfering signal X will lie outside the licensed bandwidth. Consequently, in a multiband transceiver, it will also be advantageous to be able to change clock frequencies when switching between different licensed bands.

Figure 14:
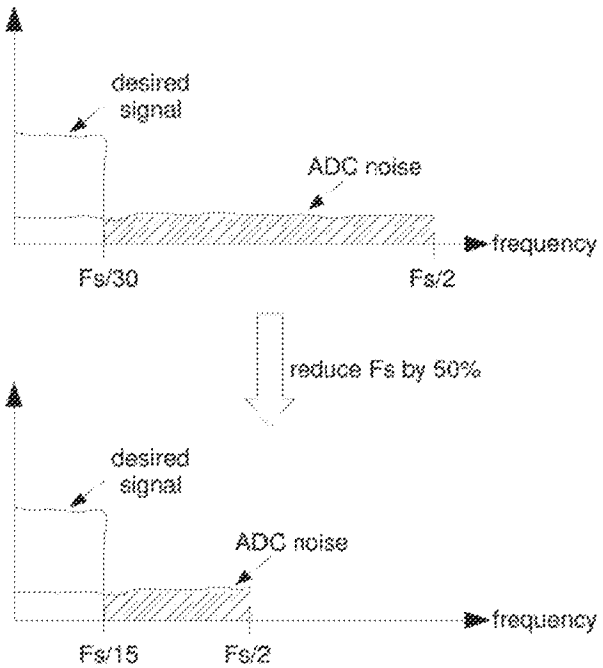
FIG. 14 shows graphs of ADC noise spectrum for two different sampling frequencies.

FIG. 14, transmitted signal spectrum:

FIG. 14 shows graphs of ADC noise spectrum for two different sampling frequencies. In the first scenario at the top of the figure, the ADC is initially running at the maximum possible sampling rate. The sampling rate greatly exceeds the bandwidth of the desired signal. Through the process of digital down sampling, the ADC noise that lies in the shaded area of the figure is removed. This results in the reduction of noise power by a factor of 14/15. In the second scenario at the bottom of the figure, the ADC sampling rate is reduced by 50%. In this mode, digital down sampling can now only reduce the ADC noise by a smaller factor of 13/30.

When the received power level of the desired signal is high, then the influence of ADC noise on the ability of the receiver to recover information from the desired signal is small. Therefore in this scenario, the ADC sampling rate can be reduced with little or no impact on receiver performance. This can provide a benefit in the form of reduced power consumption by the ADC which leads to longer battery life in portable devices. When the received power level of the desired signal is low—a condition typically referred to as the sensitivity case, the ADC noise is a relatively more significant influence on receiver performance. In this scenario, it is therefore desirable to operate the ADC at the highest sampling rate.

Figure 15:
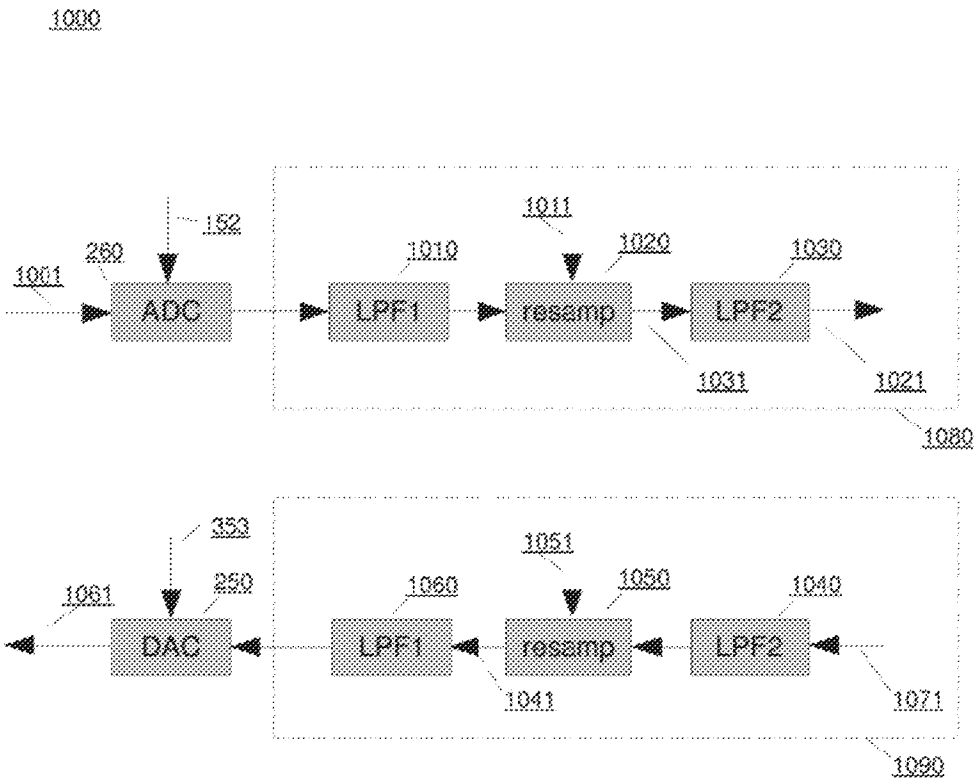
FIG. 15 shows a schematic view of circuitry for resampling after an ADC, and resampling before a DAC.
Figure 16:
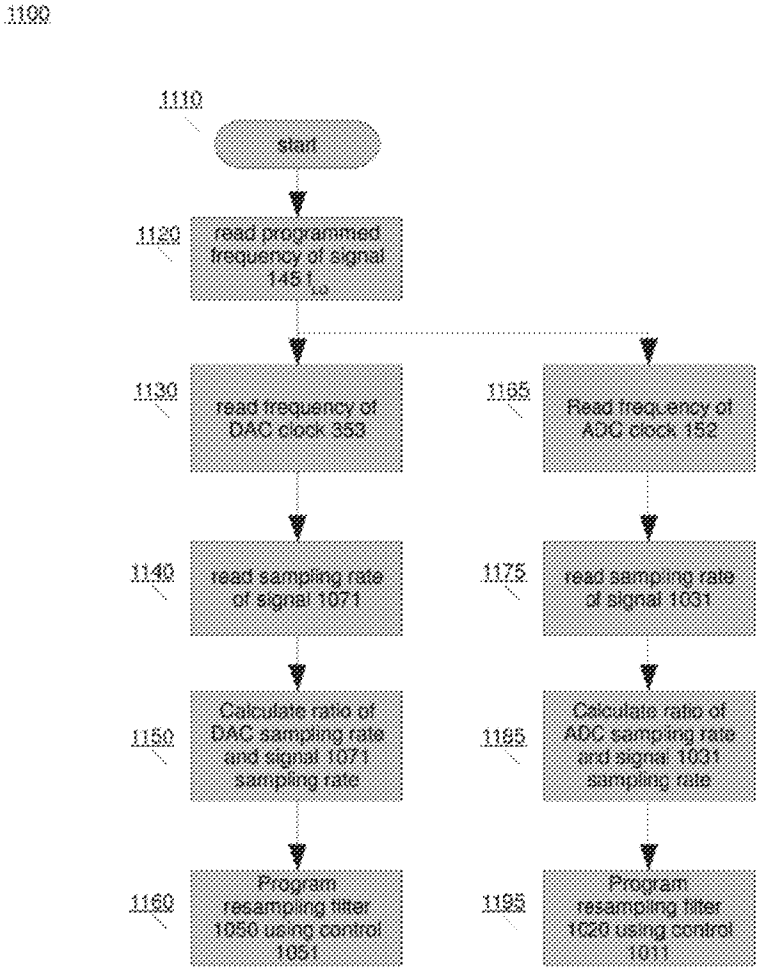
FIG. 16 shows steps in changing the resampling ratio according to an embodiment.

FIGS. 15 and 16, resampling after an ADC, and before a DAC:

FIG. 15 shows a parts 1000 of circuitry according to an embodiment to illustrate the digital resampling performed in each of the transmit and receive signal paths to compensate for changes in signals 152 and 353 due to changes in the LO signal 145. In response to the actual clock frequencies achieved for ADC sampling clock 152 and DAC sampling clock 353, microcontroller 160 sets resampling control signals 1011 and 1051 so that the output sampling rate of digital receiver 1080 and the input sampling rate of digital transmitter 1090 can remain unchanged through successive changes of carrier signal 145.

Analog signal 1001 is converted to a digital signal by ADC 260 using a sampling clock 152. Digital filter 1010 performs digital filtering operations at the same sampling rate as ADC 260. Resampling filter 1020 resamples the output of filter 1010 into a new signal 1031. The sampling rate adjustment effected by resampling filter 1020 is controlled by signal 1011, which comes from microcontroller 160. Digital filter 1030 performs digital filtering operations at the same sampling rate as signal 1031. Analog signal 1061 is created from a digital signal by DAC 250 using a sampling clock 353. Digital filter 1060 performs digital filtering operations at the same sampling rate as DAC 250. Resampling filter 1050 resamples the output of filter 1040 into a new signal 1041. The sampling rate adjustment effected by resampling filter 1050 is controlled by signal 1051 which comes from microcontroller 160. Digital filter 1040 performs digital filtering operations at the same sampling rate as signal 1071.

FIG. 16 shows a sequence of steps 1100 to illustrate the process used by microcontroller 160 to program resampling filters 1020 and 1050. The frequencies of the sampling clock 152 for ADC 260, the sampling clock 353 for DAC 250 and the digital clock 151 can be selected as a preliminary step by microcontroller 160 following the process in steps 910-960. Typically in a communications system, the sampling rate of signal 1021 at the output of digital receiver 1080 and the sampling rate of signal 1071 at the input to digital transmitter 1090 are each required to remain constant and independent of changes in the frequency of carrier signal 145. To obtain this result, microcontroller 160 adjusts the resampling ratio applied by resampling filters 1020 and 1050 in a manner that is inversely proportional to changes in the ADC sampling clock signal 152 and the DAC sampling clock signal 353 respectively. Microcontroller 160 controls digital resampling filters 1020 and 1050 using control signals 1011 and 1051 respectively via program steps 1110-95. Step 1110 is the start step, and step 1120 involves reading the programmed frequency of signal 145. At step 1130 and 1140, the frequency of DAC clock 353 and the sampling rate of signal 1071 are read in. At step 1150, the ratio of the DAC sampling rate and the sampling rate of signal 1071 is calculated. At step 1160, the resampling filter 1050 is programmed using control signal 1051.

At step 1165, a frequency of ADC clock 152 is read in. At step 1175, a sampling rate of signal 1031 is read in. At step 1185, a ratio of ADC sampling rate and signal 1031 sampling rate is calculated. At step 1195, the resampling filter 1020 is programmed using control signal 1011.

Numerous modifications, changes, variations, substitutions, and equivalents will occur to those skilled in the art without departing from the claims.

What is claimed is:

1. Circuitry for any of a transceiver, a transmitter, and a receiver, the circuitry comprising:

radio frequency (RF) circuitry;

digital circuitry;

a carrier signal generator;

a clock generator to generate a digital clock for clocking the digital circuitry; and a fallback oscillator, wherein the RF circuitry is susceptible to interference from harmonics of the clocking of the digital circuitry, wherein the carrier signal generator is coupled to provide a carrier signal to the RF circuitry, wherein the clock generator is arranged to derive a frequency of the digital clock based on a frequency divided down from a frequency of the carrier signal such that the interference to the RF circuitry occurs at frequencies that are harmonics of the carrier signal, wherein the fallback oscillator generates a fallback reference frequency, wherein the clock generator has a fallback selector to select the fallback reference frequency as a source from which to generate the digital clock when the carrier frequency is not *suitable,* wherein the fallback selector has a monitor to monitor a stability of the carrier signal, and wherein the fallback selector is operable to select the fallback reference frequency depending on the stability of the carrier signal.

2. The circuitry of claim 1, wherein the clock generator has one or more programmable frequency dividers to generate the digital clock.

3. The circuitry of claim 1, wherein the clock generator comprises:

two or more oscillators to generate the carrier signal at different carrier frequencies; and a selector to select which of the carrier frequencies is used as a source to generate the digital clock.

4. The circuitry of claim 1, wherein the digital circuitry clocked by the digital clock comprises any one or more of: analog to digital conversion circuitry for received signals, digital to analog conversion circuitry for transmitted signals, digital processing circuitry for processing the received or transmitted signals, and a digital part of the clock generator.

5. The circuitry of claim 1, further comprising a digital compensation circuit to digitally compensate at least some of the digital processing circuitry clocked by the digital clock based on a change in the frequency of the digital clock.

6. The circuitry of claim 5, wherein the digital compensation circuit comprises a digital resampling circuit to carry out resampling by a ratio inversely proportional to the change in frequency of the digital clock.

7. Circuitry for any of a transceiver, a transmitter, and a receiver, the circuitry comprising:

radio frequency (RF) circuitry;

digital circuitry;

a carrier signal generator; and a clock generator to generate a digital clock for clocking the digital circuitry, wherein the RF circuitry is susceptible to interference from harmonics of the clocking of the digital circuitry, wherein the carrier signal generator is coupled to provide a carrier signal to the RF circuitry, wherein the clock generator is arranged to derive a frequency of the digital clock based on a frequency divided down from a frequency of the carrier signal such that the interference to the RF circuitry occurs at frequencies that are harmonics of the carrier signal, wherein the clock generator has a controller to select a change in frequency of the digital clock based on a quality of an output of digital processing of received or transmitted signals clocked by the digital clock and based on the interference caused by the clocking, and wherein the controller is configured to:

estimate a digital clock rate needed by a respective type of digital receiver processing to achieve a predetermined minimum signal to noise ratio for a signal being received; and determine whether the interference caused by that estimated digital clock rate is within an acceptable threshold as a basis for selecting a change in frequency for the digital clock.

8. A method of generating a digital clock for clocking digital circuitry associated with any of a transceiver, a transmitter, and a receiver, the method comprising:

generating a carrier signal for radio frequency (RF) circuity, wherein the RF circuitry is susceptible to interference from harmonics of the clocking of the digital circuitry;

deriving a frequency of the digital clock based on a frequency divided down from a frequency of the carrier signal such that the interference to the RF circuitry occurs at frequencies which are harmonics of the carrier signal;

programming one or more programmable frequency dividers to alter the frequency of the digital clock;

estimating a digital clock frequency needed by a respective type of digital receiver processing to achieve a predetermined minimum signal to noise ratio for a signal being received;

determining whether the interference caused by that estimated digital clock frequency is within an acceptable threshold; and selecting a change in frequency for the digital clock based on whether the interference caused by the estimated clock frequency is within the acceptable threshold.

9. The method of claim 8, further comprising:

generating two or more carrier signals at different carrier frequencies; and selecting which of the carrier frequencies is used as a source to generate the digital clock.

10. The method of claim 8, further comprising resampling a digital signal used by the digital circuitry by a ratio inversely proportional to the change in frequency of the digital clock.

11. The method of claim 8, further comprising compensating for the interference in the RF circuitry from the harmonics of the clocking of the digital circuitry.

*12. Circuitry comprising:*

*two or more oscillators;*

*a clock generator coupled to the oscillators;*

*first digital circuitry coupled to the clock generator; and*

*second digital circuitry coupled to the clock generator;*

*wherein the clock generator comprises a selector, a first frequency divider, and a second frequency divider,*

*wherein the first frequency divider and the second frequency divider are coupled to the oscillators,*

*wherein the first frequency divider is configured to provide a first clock signal to the first digital circuitry,*

*wherein the second frequency divider is configured to provide a second clock signal to the second digital circuitry,*

*wherein the selector is configured to select which of the two or more oscillators is used as a source to generate the first clock signal and the second clock signal, and comprises a monitor to monitor stability of signals from the oscillators.*

*13. The circuitry of claim 12, further comprising radio frequency (RF) circuitry, wherein one of the oscillators is configured to provide a carrier signal to the RF circuitry.*

*14. The circuitry of claim 12, wherein the first digital circuitry further comprises an analog-to-digital converter (ADC), and wherein the second digital circuitry comprises a digital-to-analog converter (DAC).*

* * * * *